United States Patent [19]

Ohmi et al.

[11] 4,257,312
[45] Mar. 24, 1981

[54] TANDEM DIAPHRAGM BRAKE BOOSTER

[75] Inventors: Atsushi Ohmi, Anjo; Yoichi Furuta, Gifu, both of Japan

[73] Assignee: Aisin Seiki Kabushiki Kaisha, Aichi, Japan

[21] Appl. No.: 960,626

[22] Filed: Nov. 14, 1978

[30] Foreign Application Priority Data

Nov. 14, 1977 [JP] Japan .................. 52-152435[U]

[51] Int. Cl.³ .................. F15B 9/10; F01B 19/00; F16J 3/00
[52] U.S. Cl. .................. 91/369 A; 91/376 R; 92/48; 92/99
[58] Field of Search .................. 91/369 A; 92/48, 49

[56] References Cited

U.S. PATENT DOCUMENTS

| 3,096,689 | 7/1963 | Kytta | 91/369 A |
| 3,152,518 | 10/1964 | Ayers, Jr. | 92/49 |
| 3,289,547 | 12/1966 | Kytta | 91/369 A |
| 3,388,635 | 6/1968 | Hager | 91/369 A |
| 3,603,208 | 9/1971 | Kytta | 91/376 |
| 4,069,742 | 1/1978 | Gephart et al. | 91/369 A |
| 4,173,172 | 11/1979 | Ohmi | 91/369 A |

FOREIGN PATENT DOCUMENTS 964289  7/1964  United Kingdom .................. 91/369 A

*Primary Examiner*—Paul E. Maslousky
*Attorney, Agent, or Firm*—Oblon, Fisher, Spivak, McClelland & Maier

[57] ABSTRACT

A tandem diaphragm brake booster includes first and second diaphragms disposed in a housing and a pair of diaphragm pistons which are axially movable for assisting braking efforts through manual operation. The two diaphragm pistons are connected to each other by a key member which also serves to prevent an air valve from accidentally returning.

2 Claims, 2 Drawing Figures

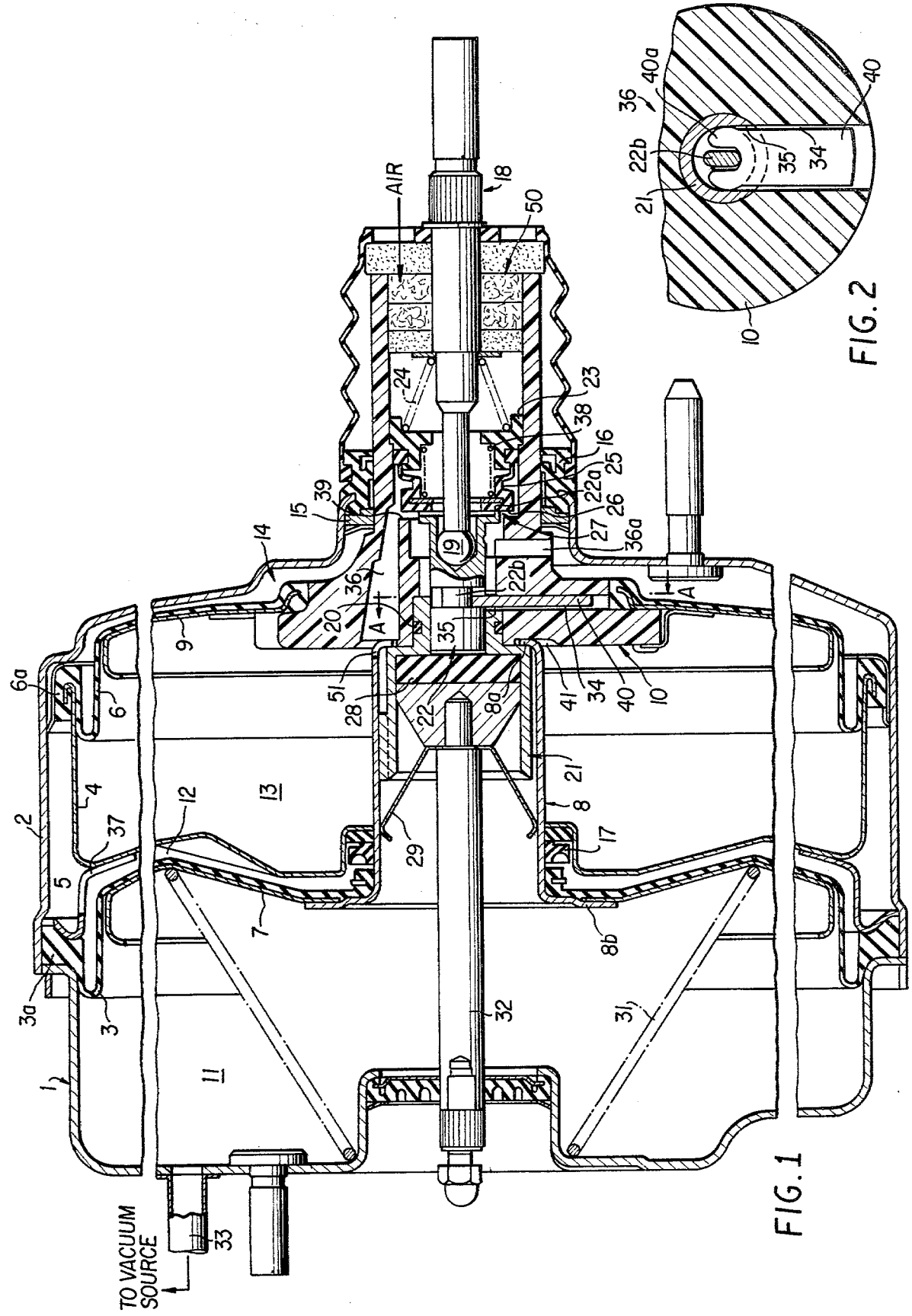

TANDEM DIAPHRAGM BRAKE BOOSTER

BACKGROUND OF THE INVENTION

1. Field of the Invention

This invention relates to brake boosters for vehicles and more particularly to a tandem diaphragm brake booster of the type used in association with a vehicle brake system.

2. Description of the Prior Art

In known vehicle brake systems, the space provided for a brake booster is severely restricted, especially in the radial direction of the vehicle body as compared to the longitudinal direction thereof. In order to save space in such radial direction, a tandem type diaphragm brake booster has been frequently used.

Conventionally, as is shown in U.S. Pat. No. 3,603,208, first and second diaphragms in such a tandem diaphragm booster arrangement are secured by bolts and nuts 50, 52. This connection is very difficult to manufacture and necessitates the use of bolts and nuts, as indicated, which of course serves to increase the manufacturing cost. Further, a key member (not numbered, but appearing in FIG. 1 of such U.S. Patent) is disposed between two portions 38 and 40 of a hub 42 for preventing a valve means 76 from returning during valve operation.

SUMMARY OF THE INVENTION

According to the present invention, a key member is provided in a tandem diaphragm brake booster both for preventing a valve means disposed therein from returning and for securing two diaphragm sections, without using any further connecting means, so as to be simple in design, inexpensive to manufacture and efficient in its operation.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several views, and wherein:

FIG. 1 is a cross-sectional view of a preferred embodiment of the present invention; and FIG. 2 is a fragmentary cross-sectional view taken along line II—II of FIG. 1.

DETAILED DESCRIPTION OF THE PREFERRED EMBODIMENTS

Referring now to the drawings, there is shown in FIG. 1 a booster housing formed in two shell sections 1 and 2 that are joined together by a twist lock type connection. Section 1 is provided with a central opening that includes a seal while section 2 is provided with a similar central opening that includes a seal 16 which serves as a dust boot.

A bead 3a of a first diaphragm 3 is compressed between a securing member 5 and a radial abutting portion of the shell section 1. Within the shell section 2 is provided a cup-shaped member 4 which is secured to the securing member 5. A bead 6a of a second diaphragm is secured to the open end of the cup-shaped member 4.

The first diaphragm 3 is secured to a first movable wall 7 and a cylindrical member 8 at its inner periphery. The cylindrical member 8 is made of a metal plate and one end 8b thereof is radially outwardly extended and welded to the first movable wall 7. The other end 8a of the cylindrical member 8 is radially inwardly extended to be inserted between a case member 21 and a piston 10. Similarly, the second diaphragm 6 is secured to a second movable wall 9 and the piston 10 at its inner periphery. Thus, the booster housing includes four chambers 11, 12, 13 and 14 formed therein.

The first chamber 11 is provided between the inside wall of the shell section 1 and the first diaphragm 3 and is always connected to a vacuum source through port 33. The second chamber 12 is provided between the first diaphragm 3 and the cup-shaped member 4. The third chamber 13 is provided between the cup-shaped member 4 and the second diaphragm 6 and the fourth chamber 14 is provided between the second diaphragm 6 and the shell section 2. Numeral 15 designates a bearing member which slidably supports an outer periphery of the piston 10.

The seal 16 is also supported on the bearing 15 for air-tightly engaging with the outer periphery of the piston 10. A seal member 17 is provided between the cup-shaped member 4 and the outer periphery of the cylindrical member 8 for providing a sealing function therebetween.

A connecting rod 18, extending outwardly from the second piston 10, is operatively connected to a brake pedal or the like (not shown) for operating the booster upon axial movement thereof. The inner end of the rod 18 is provided with a ball head 19 operatively engaged with a plunger 22. A disk-like plate 23 is provided within the piston 10 and is biased to the left by a spring 24. The disk-like plate 23 includes a seal member 25, the inner face 26 of which serves as a valve seat of an air valve 27. The valve seat 26 is in sealing contact with one end surface 22a of the plunger 22. The case member 21 is disposed in a stepped bore of the cylindrical member 8 and a bore of the second piston 10. The plunger 22 is disposed in a reduced diameter portion of the case member 21.

A reaction member 28 made of an elastic material, such as rubber, is disposed in the large diameter portion of the case member 21. The case member 21 is biased to the right by a spring 29 so that an inwardly extending right end 8a of the cylindrical member 8 may be supported between the large diameter portion of the case member 21 and the left end of the piston 10. A spring 31 is disposed in the first chamber 11 for biasing the cylindrical member 8 toward the piston 10.

A push rod 32 is connected at its one end to a master cylinder piston (not shown) and at its other end to the case member 21. A passage 36 is provided in the piston 10 for connecting the third chamber 13 with the fourth chamber 14, through a passage 36a and a gap 39 between the inside wall of the piston 10 and the valve seat 26 of the air valve 27. The fourth chamber 14 is in fluid communication with the second chamber 12 through passage 37 provided in the securing member 5.

The first and second chambers 11 and 13 are in fluid communication with each other through passage 51 provided on the cylindrical member 8. The case member 21 includes an undercut portion 35 in which a fork-type key 40 is disposed. The key 40 is also inserted into a recess 34 provided in the piston 10. A fork portion 40a of the key 40 receives a reduced diameter portion 22b of the plunger 22, as is best shown in FIG. 2.

The reduced diameter portion 22b of the plunger 22 is designed to have a sufficient length so that the plunger 22 is axially movable for accomplishing the valve opening and closing operation. The fork portion 40a of the key member 40 restricts further axial movement of the plunger 22 by abutting the shoulders of the large diameter portions of the plunger 22. The inwardly extending end 8a of the cylindrical member 8 is retained between the case member 21 and the piston 10 by the key member 40 such that extending 8a is inserted between the piston 10 and the case member 21.

In operation, when the rod 18 is operated by the brake pedal to move to the left, the plunger 22 is then moved to the left. Simultaneously, the seal member 25 is moved to the left by the biasing force of a spring 38, maintaining the valve seat 26 of the seal member 25 in contact with the right end 22a of the plunger 22. This leftward movement of the seal member 25 is prevented when the valve seat 26 is engaged with the inner wall of the piston 10 to interrupt communication between the third and fourth chamber 13 and 14.

Further leftward movement of the plunger 22 will release the engagement between the valve seat 26 and the right end 22a of the plunger 22 to thereby introduce air into the fourth chamber 14 from the open end of the piston 10 through air filters 50 and passage 36a. The air introduced into the fourth chamber 14 is further introduced into the second chamber 12 through passage 37. The pressure differentials will then prevail between the first and second chambers 11 and 12 and third and fourth chambers 13 and 14, respectively. Therefore, the cylindrical member and pistons 8 and 10 respectively, secured to the respective first and second diaphragms 3, 6 initiate movement to the left due to such pressure differentials.

The case member 21, which is keyed to the piston 10, is also moved to the left to move the push rod 32 of the master cylinder, to thereby cause the master cylinder to generate brake pressure for brake operation. Reaction pressure on the rod 32 will deform the elastic reaction member 28 to abut plunger 22, providing a reaction which opposes the valve opening movement of the rod 18. After a desired braking effort is achieved, forward (leftward) movement of the rod 18 is stopped, following which the right end of the plunger 22 engages with the valve seat 26, thereby preventing further air flow into the fourth chamber 14.

When it is desired to reduce the force generated by the booster, the force applied to the rod 18 is reduced whereupon the reaction member 28 and spring 24 cause the plunger 22 to bias the valve seat 26 out of engagement with the inner side wall of the piston 10 and so reduce the pressure in the fourth and second chambers 14, 12, and complete removal of force of the rod 18 permits the valve parts 27 to assume the position shown in FIG. 1 to equalize the vacuum in all four chambers 11, 12, 13 and 14.

Since the cylindrical member 8 is made of a metal plate, the connection between the left end 8b of the first piston and the first movable wall 7 may be easily performed by welding resulting in strengthening the effective stroke of the cylindrical member 8. The portion 8b of the cylindrical member 8 may be separately made by pressing and thereafter may be welded to the remaining main part of the cylindrical member 8.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A tandem diaphragm brake booster which comprises:
    a housing;
    first and second diaphragms disposed in said housing in spaced relation to each other;
    a partition wall disposed between said first and second diaphragms within said housing for defining first, second, third and fourth chambers within said housing;
    a securing member interconnecting said partition wall with said housing;
    cylindrical means secured to said first diaphragm and axially slidable therewith, said cylindrical means being made of metal;
    piston means secured to said second diaphragm and axially slidable therewith;
    first fluid passage means provided in said cylindrical means for fluid communication between said first and third chambers, said first chamber being in communication with a vacuum source;
    second fluid passage means provided in said securing member for fluid communication between said second and fourth chambers;
    third fluid passage means provided in said piston means for fluid communication between said third and fourth chambers;
    valve means disposed in said third fluid passage means for preventing fluid communication between said third and fourth chambers and introducing atmospheric pressure into said fourth chamber, thereby creating pressure differentials between said first and second chambers and said third and fourth chambers, respectively;
    and operator-operated means for actuating said valve means in response to manual operation;
    said valve means including a plunger operatively engaged with said operator-operated means and axially movable within said piston means;
    a case member disposed in said cylindrical means and said piston means and receiving therein said plunger; and
    a key member disposed in said piston means and extending radially into engagement with both said plunger and said case member to thereby retain said case member in said piston means and to limit axial movement of said plunger, one end of said cylindrical means extending radially inwardly and being disposed and retained between said case member and said piston means, so as to connect said cylindrical means and said piston means by said key member wherein the other end of said cylindrical means extends radially outwardly and is secured to said first diaphragm.

2. A tandem diaphragm brake booster of claim 1 wherein said first diaphragm includes a first movable wall to which said other end of said cylindrical means is welded.

* * * * *